United States Patent Office 3,694,283
Patented Sept. 26, 1972

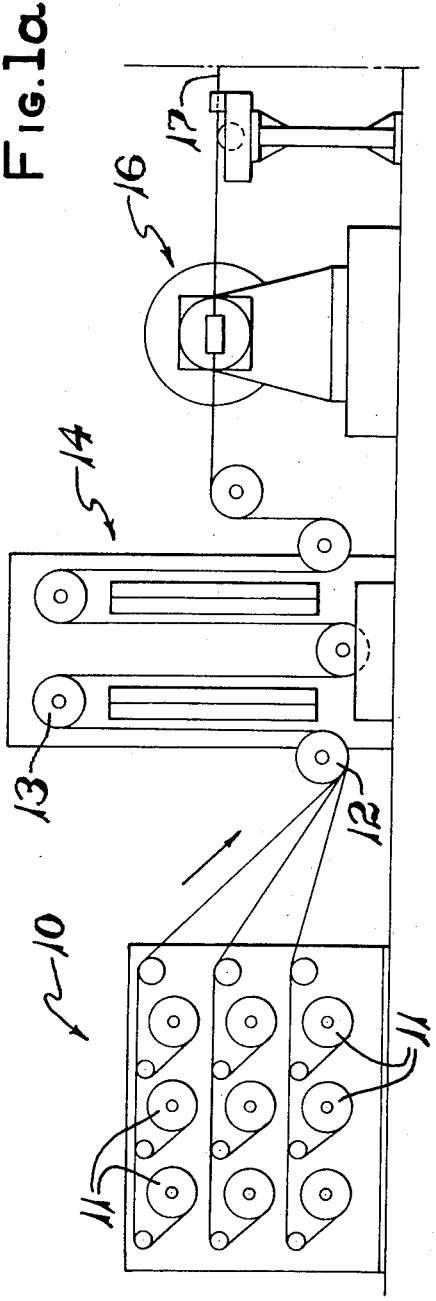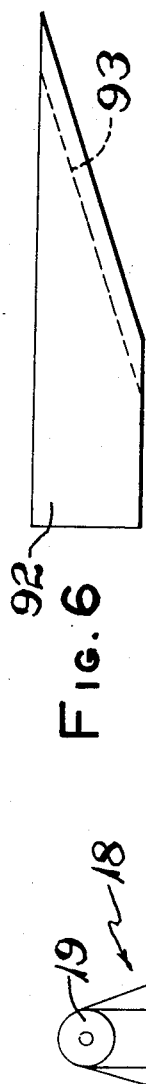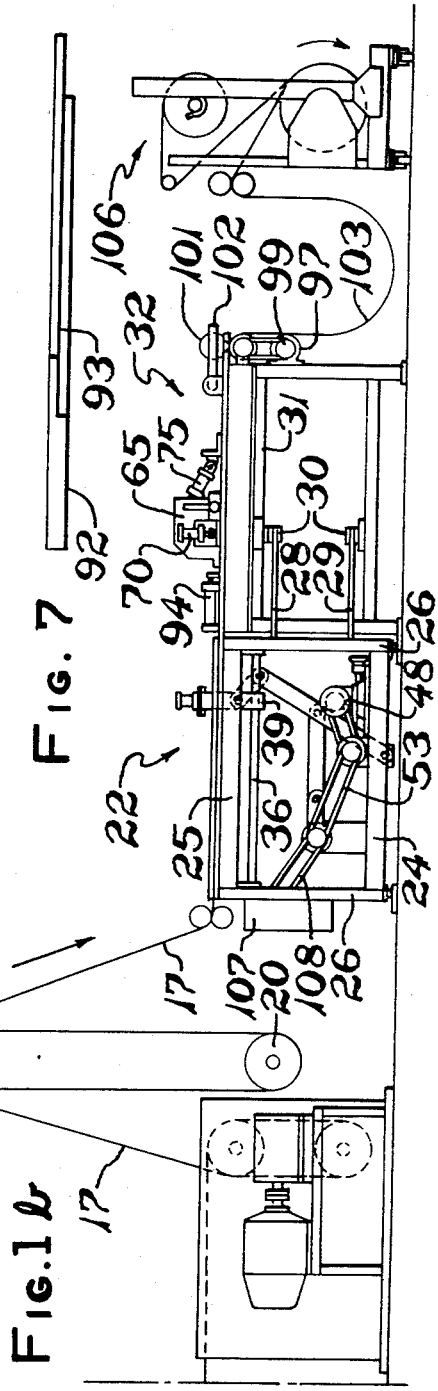

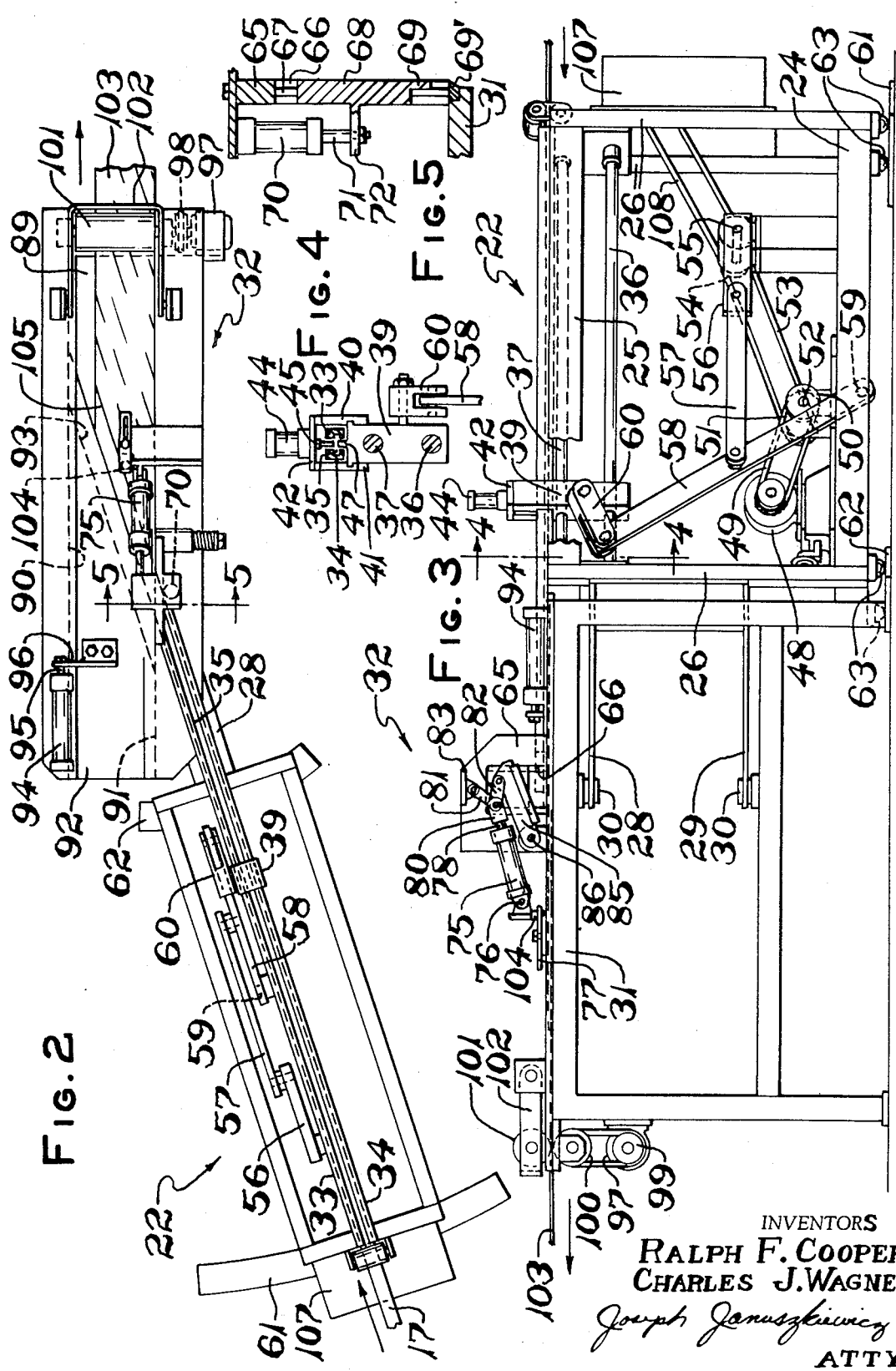

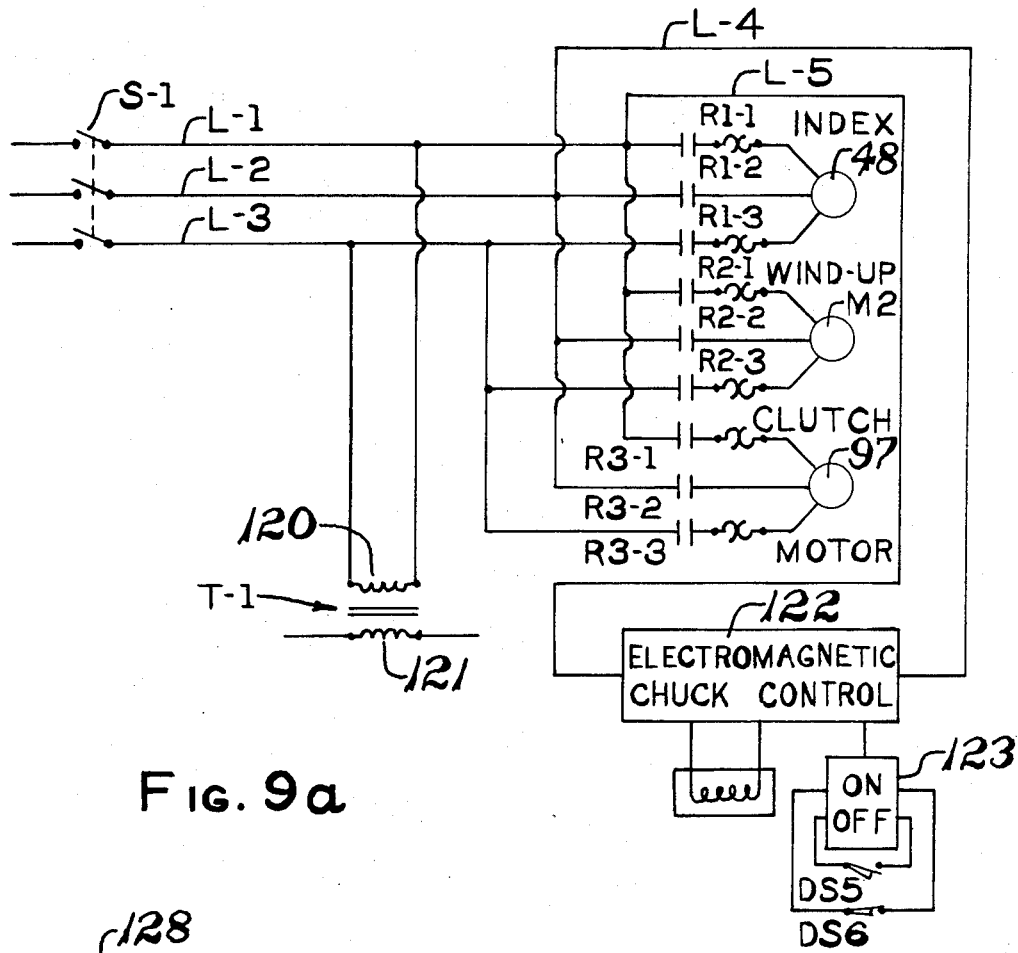
FIG. 9a
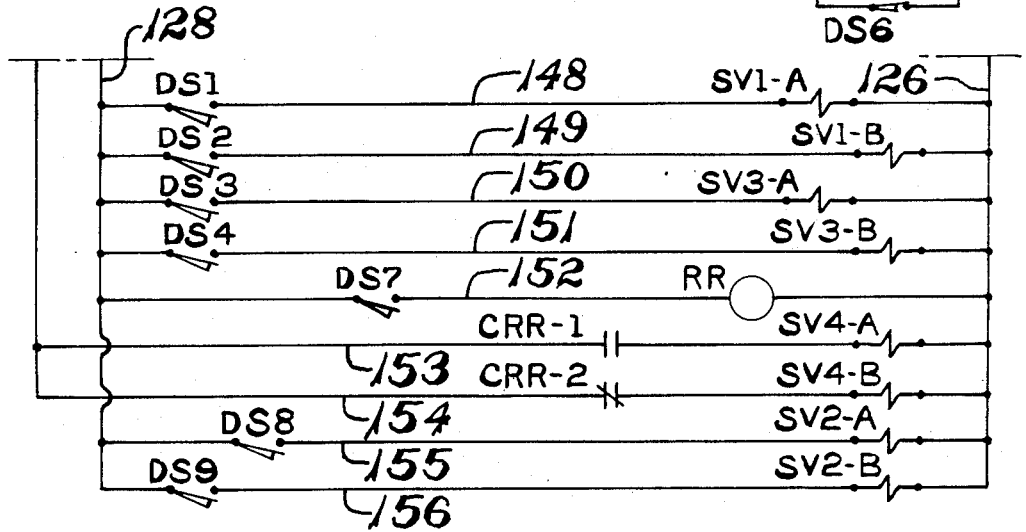
INVENTORS
RALPH F. COOPER
CHARLES J. WAGNER
Joseph Januszkiewicz
ATTY.

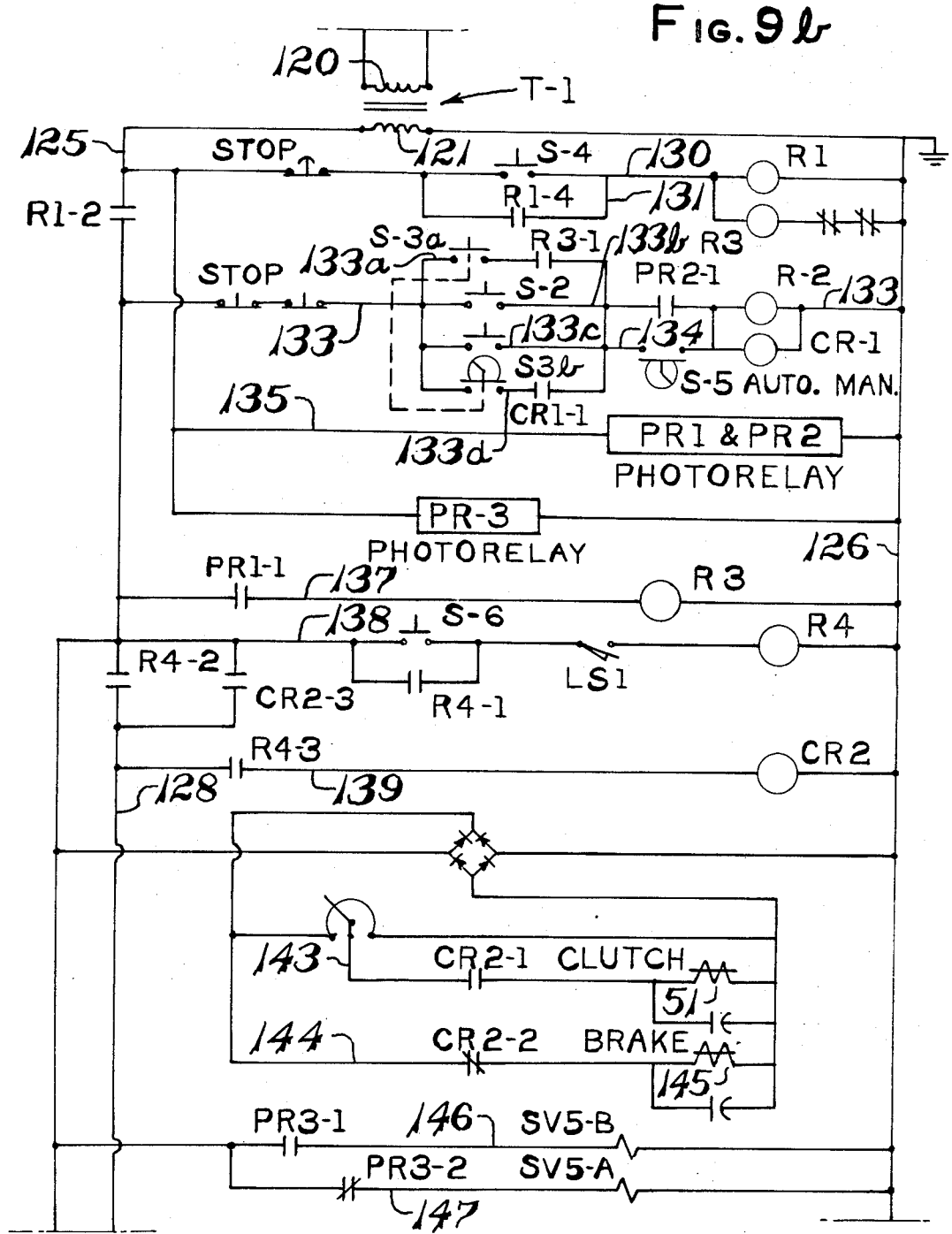

3,694,283
WIRE OVERHEAD
Ralph F. Cooper and Charles J. Wagner, Akron, Ohio, assignors to the B. F. Goodrich Company, New York, N.Y.
Original application July 13, 1966, Ser. No. 564,778, now Patent No. 3,573,135. Divided and this application Oct. 23, 1969, Ser. No. 870,312
Int. Cl. B31f 5/00
U.S. Cl. 156—159
8 Claims

ABSTRACT OF THE DISCLOSURE

A method for fabricating a continuous web having acute angularly disposed wire strands relative to its longitudinally extending length from narrow strips by passing a plurality of wire strands through an extruder which prepares a narrow width tape with wire strands embedded therein. Such tape is then cut into elongated sections, after which the sections are spliced along their edges so that their respective cut edges form the side edges of a continuous web that may be used as a wire overhead.

CROSS REFERENCE TO RELATED APPLICATION

This application is a division of copending application Ser. No. 564,778, now U.S. Pat. 3,573,135.

This invention relates to a bias cutting apparatus and method; and, more particularly, to the apparatus and method for fabricating wire overhead strips for use in making bands for radial tires.

Heretofore, in the manufacture of strips for wire overhead use in tires, it has been the practice to use a plurality of reels which feed the plural strands of wire into a calendering apparatus, which apparatus applies a thin coating of rubber between the longitudinally extending wires and coats such wires to form a sheet of calendered stock, after which such stock material is fed onto the conveyor table of a bias cutter. A bias cutter comprises a power-driven circular knife that traverses angularly across the conveyor table to cut the material at a bias angle. Such sheet of parallel strands of wire with rubber coating thereon as used herein is referred to as a wire strip material to differentiate such material from fabric or cord fabric for tires which is composed of rubberized cloth. Such material is fed past the circular knife by the conveyor and brought to rest after the requisite length of wire strip material stock has been conveyed past the knife. Since it is necessary to sever the stock to the exact length desired, it is necessary to slow down the stock preparatory to its positioning prior to the severing operation. Difficulty has been experienced in moving such wide stock quickly and in positioning such stock accurately for the cutting operation. Maintenance also was found to be quite high as a result of the rapid acceleration and deceleration of the mechanical equipment.

The bias cutter then traverses the calendered wire strip material and severs a section of such material after which such bias cut material is fed laterally into position with another piece of bias cut material and the respective lateral portions would be spliced by manual operation. The bias cutting would be continued followed by splicing the respective lateral portions together making a longitudinally extending strip of bias cut material referred to as a wire overhead material. Ordinarily, such wire strip material in the calendering process would be made in widths varying from 24 inches to 36 inches and even wider, and it was felt that it was more advantageous to calender as wide a strip of material as possible. Accurate prepositioning and advancing of the material is difficult and time consuming.

The present invention proposes to provide an apparatus and a method which continuously processes from a plurality of reels which reels are considerably less than heretofore thought practical or desirable, reducing the total number of reels to ½₄ and process such wires through an extruder wherein such wires are coated and formed into a narrow width tape in the order of approximately one inch width. The tape is then indexed a predetermined amount, cut to length at a bias angle and then spliced into a strip of previously cut sections of wire overhead at a speed faster than the method heretofore used such as calendering. The cost of the apparatus employed in carrying out such process is materially less than heretofore used, making it feasible to construct and manufacture tires which employ wire overhead bands on a small economical scale. The maintenance problem is reduced and the necessity of maintaining a large coordinated movement of wire is eliminated, which consumed a large percentage of the shut-down time.

The present invention contemplates the use of an extruder cooperative with a supply of wire to fabricate a tape of narrow width rapidly, cutting such tape to length and stitching such tape to the previously bias cut tape to form a wire overhead strip economically.

An object of the present invention is to provide an inexpensive apparatus which efficiently and effectively fabricates a wire overhead strip of material.

A further object of this invention is to provide a novel apparatus which butt splices a wire overhead continuous strip from a narrow width extruded wire tape.

Another object of this invention is to provide a novel apparatus which coordinates the extrusion of a narrow width tape with the severing of such tape and splicing such tape to fabricate economically a wire overhead strip of material.

A further object of this invention is to provide a novel method of fabricating bias cut wire overhead strip stock.

An object of this invention is to provide a novel method for fabricating a multiple wire rubber covered strip of material wherein the wires are located at an angle relative to the longitudinally extending length of the strip material.

These and other objects and advantages will appear more fully in the following detailed description when considered in connection with the accompanying drawings in which:

FIGS. 1a and 1b are side elevational views of the entire wire overhead strip fabricating apparatus constructed in accordance with the principles of this invention which when longitudinally aligned show the entire wire overhead strip fabricating apparatus of this invention.

FIG. 2 is a plan view of the wire overhead strip fabricating apparatus showing the feeding, shearing and splicing means with the wire tape being conveyed left to right.

FIG. 3 is a side elevation view of the wire overhead apparatus as shown in FIG. 4 from the back side showing the tape being conveyed from right to left.

FIG. 4 is a cross sectional view of the feeding means taken along the line 4—4 of FIG. 3.

FIG. 5 is a cross sectional view of the clamping means taken along line 5—5 of FIG. 2.

FIG. 6 is a plan view of the splicing plate.

FIG. 7 is a side elevational view of the splicing plate.

FIGS. 9a and 9b illustrate an electrical control circuit for the apparatus.

Figure 8:
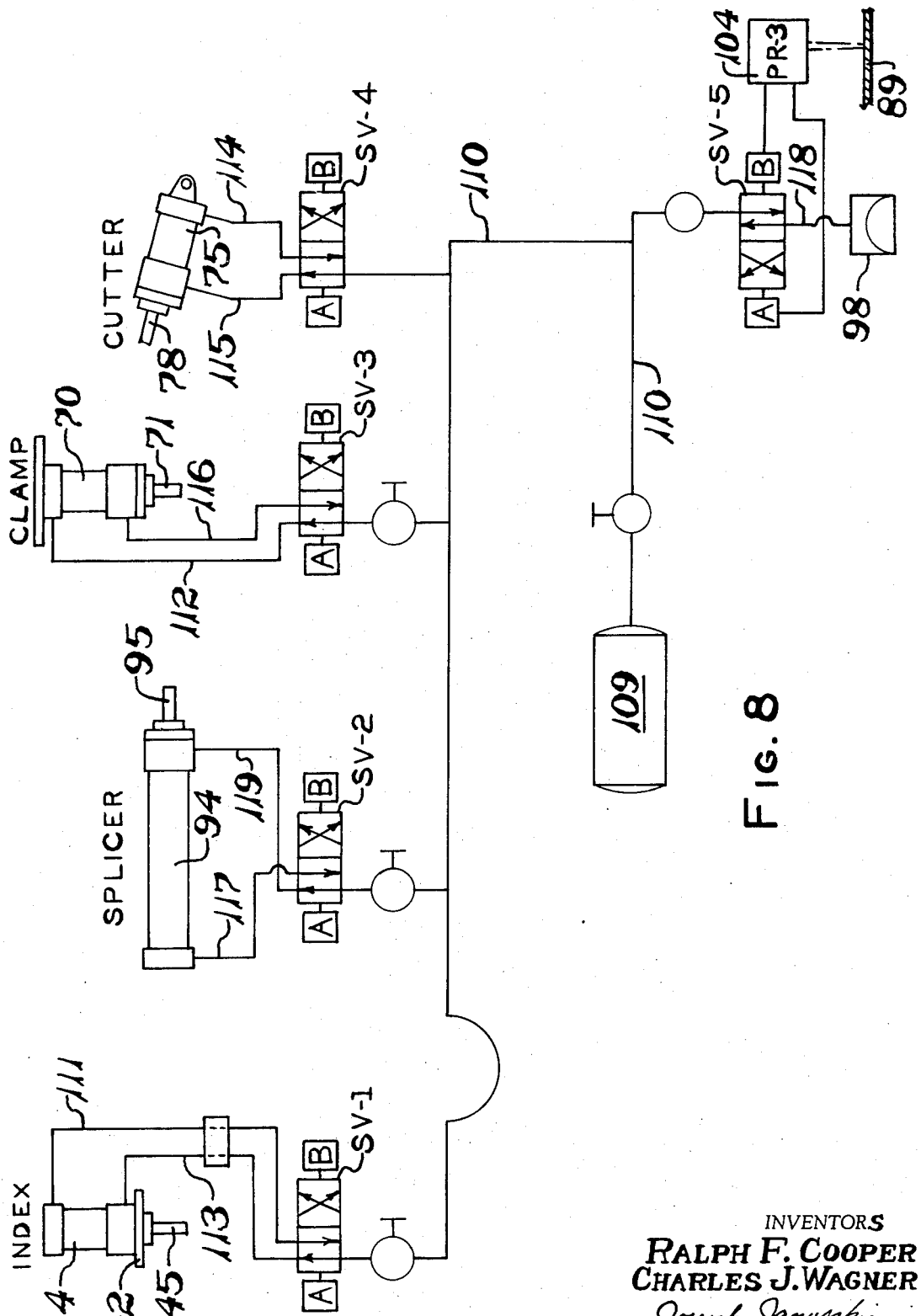
FIG. 8 is a diagrammatic view of the pneumatic control system.

In the drawings, the reference numeral 10 generally designates a strand wire let-off device having a plurality of spools 11 which are mounted on a frame which is provided with suitable tension devices (not shown) normally used thereon. The strands of wire are withdrawn from the respective spools 11 and are directed downwardly toward a grooved sheave 12 which provides uniform spacing for the respective wires. If desired, the spacing may be maintained through suitable guidance such as a comb as is old and well known in the art. The wire strands are then directed over a sheave 13 mounted above the sheave 12 into a dip and dry unit 14 which cleanses the respective wires of foreign matter and provides for the drying of such wire strands as they pass over a plurality of pulleys prior to guiding such wire strands to an extruder 16 which receives a supply of rubber or other elastomeric material from a suitable source. Such extruder 16 forces a mass of elastomeric material about the spaced wires to form a thin continuous running tape 17 which has paralel strands of wire with elastomeric material therebetween. Such tape 17 issues from the extruder and is directed to a festooner 18 which may be of conventional construction and includes an upper sheave 19 which is independently mounted on a common horizontal axis which is suitably secured to the framework of the festooner (shown schematically) and a lower sheave 20 which is independently mounted for rotation on a common axis movable vertically upwardly and downwardly relative to the upper sheave 19 thereby storing the tape 17 for periodic withdrawal from the festooner. The tape 17 is then directed to an index feed unit 22 which comprises a pair of horizontal extending lower supports 24 and a pair of upper horizontal extending supports 25. The horizontal supports 24 and 25 are properly spaced and secured to vertically extending support frames 26 as shown in FIG. 3. Secured to the forwardly disposed vertical supports 26 are a pair of horizontally extending brackets 28 and 29, which brackets 28 and 29 have their outermost end portions pivotally secured as at 30 to the supporting framework 31 of a cutter and splicing unit 32. The upper portion of index feed unit 22 has a pair of guide members 33 and 34, U-shaped in cross section (FIG. 4), which are suitably attached to the respective end portions of the vertically extending supports 26. The respective recessed portions of such U-shaped members 33 and 34 define a recess, slot or guide means which is designated 35 (FIG. 4) which guides the tape 17 in its longitudinal movement along its recess. Extending in a general longitudinal direction on index feed unit 22 are a pair of parallel guide rods 36 and 37 which have their respective end portions secured to brackets at the respective end portions of such feed unit 22. Slidably mounted on the respective guide rods 36 and 37 is a carriage 39 having a pair of upwardly extending plates 40 and 41 which have secured to their upper end portion a horizontally disposed plate 42 which houses a pneumatic index cylinder 44. Horizontally disposed plate 42 is suitably recessed at its central portion to provide for the extension and retraction of the piston rod 45 of pneumatic cylinder 44. Carriage 39 in cooperation with plates 40 and 41 encompass guide members 33 and 34. The lowermost end portion of rod 45 is rectangular shaped for cooperation with an upwardly extending projection 47 on carriage 39 to captively secure the tape 17 therebetween upon the pressurization of the head end of pneumatic index cylinder 44. With tape 17 secured between projection 47 and piston rod 45, linear movement of carriage 39 will move the tape 17 in the same direction of movement. Pressurization of the rod end of pneumatic cylinder 44 releases engagement with the tape and permits the retraction of the carriage 39 without effecting the movement of the tape 17. A variable speed motor 48 is mounted between the lower horizontal supports 24 and is connected via belt 49 to drive a sheave 50 which through clutch 51 drives a shaft 52. The output of shaft 52 is connected via a belt 53 to drive a sheave 54 and drive shaft 55. A variable speed control device such as a Reeves motor pulley is employed between the motor 48 and the drive shaft 55 to provide for a selective variable speed control. Suitably keyed to drive shaft 55 is one end of an arm member 56 which has its outer end portion pivotally connected to the one end of a pitman arm 57. The other end portion of pitman arm 57 is pivotally connected to the intermediate portion of a longitudinally extending oscillating lever 58. Lever 58 has its lowermost end portion pivotally connected as at 59 to the lower horizontally extending brackets 24 and its upper end portion pivotally connected to the bifurcated end portion of a lever arm 60. The other end portion lever arm 60 is pivotally connected to the carriage 39 to impart reciprocal movement thereto. The rotation of arm member 56 imparts an oscillating movement to the lever 58 which in turn reciprocates the carriage 39 along the guide rods 36 and 37. Index feed unit 22 is supported on a pair of arcuately shaped tracks 61 and 62 which cooperate with roller bearings 63 to permit the angular adjustment of the index feed unit 22 relative to the stationary cutter and splicer unit 32. Suitable lock means are provided to secure the feed unit 22 in the desired position relative to the cutter and splicing unit 32. Mounted on the supporting framework 31 of cutter and splicer unit 32 is a bracket 65 (FIGS. 1, 3 and 5) which is recessed at its intermediate portion as at 66 to provide longitudinally extending guideways 67 to accommodate a rectangularly shaped clamping block 68 which is grooved at its respective side portions for frictional engagement with the respective guideways 67. Clamping block 68 is thus movable in a vertical direction on the bracket 65. The lowermost end portion of clamping block 68 is recessed to provide a downwardly extending projection 69 which cooperates with a blade 69' (FIG. 5) that is suitably secured to the supporting framework 31 closely adjacent the clamping bracket 65. Secured to the upper end portion of bracket 65 is a pneumatic clamping cylinder 70 which has its downwardly extending piston rod 71 secured via bracket 72 to the movable clamping block 68. Pressurization of the head end of pneumatic clamping cylinder 70 moves block 68 downwardly to clamp the tape which is extending across blade 70 into clamping engagement with such blade 69' for the cutting action to be described. Pressurization of the rod end of pneumatic clamping cylinder 70 operates to release the clamping action of clamping block 68 with the tape 17.

To provide the cutting action for the tape that is clamped by the clamping block 68 a pneumatic cutter cylinder 75 has its head end portion pivotally secured as at 76 to a bracket 77, which bracket 77 is mounted on the upper end portion of support framework 31. Pneumatic cutter cylinder 75 has its piston rod 78 pivotally mounted to a bifurcated bracket 80 which is pivotally connected to one end portions of levers 81 and 82. The other end of lever 81 is pivotally secured to a bracket 83 which is mounted on the upper end portion of bracket 65 while the other end portion of levers 81 and 82. The other end of lever a shearing blade 85. The other end of shearing blade 85 is pivotally secured as at 86 to a lowermost end portion of bracket 65. Pressurization of the head end of pneumatic cutter cylinder 75 operates to move piston rod 78 outwardly or to the right as viewed in FIG. 3 which pivots the shearing blade 85 downwardly in a clockwise direction into cooperative shearing action with the blade 69' to shear the tape 17 that is clamped between blade 69' and clamping block 69. With the piston rod 78 connected to the layers 81 and 82 in a toggle link arrangement, the extension of the piston rod 78 effects the cutting action followed by a counterclockwise movement of the blade 85 as viewed in FIG. 3 which effects retraction of the cutter blade 85. Pressurization of the rod end of pneumatic cylinder 75 operates similarly in the initial action of the toggle link arrangement of levers 81 and 82 to effect a cutting action and then a retraction of the shearing blade 85 into the position shown in FIG. 3. The upper end portion of supporting framework 31 has a longitudinally extending table 89 which is subject to being magnetized thereby providing a chucking means which flattens the cut section of tape onto the table 89. Such tables or chucks are old and well known in the art and are available commercially. The degree of magnetization can be controlled to selectively provide available holding power in accordance with the desire of the operator. Table 89 is recessed at 90 and 91 to provide guideways for the linear guiding of a splicing plate 92 which is slidably received thereon. The splicing plate 92 is recessed at its forward portion as at 93 (FIGS. 2 and 7) which recess is adapted to overlap the severed tape section 17 such that the tape is held in a flattened condition as it is spliced to the previously spliced sections of tape in a manner to be described. Mounted on a rearward portion of supporting framework 31 is a variable speed motor 97 which is connected through a clutch 98 to drive a guide sheave 99. Mounted above sheave 99 as seen in FIG. 3 is a driven roller 100 with its uppermost portion being tangent to the plane of table 89. Mounted above roller 100 and cooperative therewith is an idler roller 101 that has its respective end portions journaled in a U-shaped bracket 102 whereby the bracket 102 may be pivoted upwardly out of contact with the driven roller 100 to permit adjusting of the spliced sections of the wire overhead 103. Mounted closely adjacent the head end portion of pneumatic cutter cylinder 75 on bracket 77 is an electric eye 104 that controls the energization and de-energization of the clutch 98. Electric eye 104 through clutch 98 controls the advance of the wire overhead after the splicing action in a manner to be described such that the trailing edge 105 of the wire overhead is directly underneath, thereby prepositioning such trailing edge 105 for the subsequent splicing operation. The wire overhead 103 is fed into a windup unit designated generally as 106 which units are old and are known in the art.

In the operation of the wire overhead fabricating unit, strands of wire are let off from the several spools 11 from the wire let-off device 10 which are directed downwardly toward a grooved sheave 12 which provides the uniform spacing for the respective wires. The wire strands are then dipped into a solution at the dip and dry unit 14 which cleanses them of foreign matter and dries such wire strands in preparation for the coating and extruding operation which follows. The wire strands are then directed to an extruder 16 which receives a supply of rubber or other elastomeric material which forces the mass of elastomeric material about the spaced wires to form a continuous running tape 17 which has parallel strands of wire with elastomeric material therebetween. The tape 17 is then fed to a festooner 18 of conventional construction which stores the tape 17 for periodic feeding to an index feed unit 22. With motor 48 energized, the lever arm 58 reciprocates the carriage 39 along guideways 36 and 37. The coordination of the various pneumatic cylinders is accomplished through a rotatable drum control unit which is mounted in a housing 107 which receives its power from a belt 108 which is coupled to sheave 54. Such drum control unit, which is old and well known in the art, operates through suitable adjustable cams to control solenoid operated air valves shown in FIG. 8. Solenoid B of solenoid operated air valve SV–1 is energized supplying pressurized fluid from a suitable source such as tank 109 via main pressure conduit 110 to conduit 111 which directs pressurized fluid to the head end of pneumatic index cylinder 44. Extension of the piston rod of index cylinder 44 clamps the tape 17 between the upward extending projection 47 and piston rod 45. Carriage 39 moves the tape forwardly through the recess between the respective U-shaped guide blocks 33 and 34 for movement past the cutter 85 onto the table 89. Upon completion of the forward stroke by carriage 39, solenoid A of solenoid operated air valve SV–3 is energized connecting pressurized conduit 110 with conduit 112 which moves the clamping block 68 downwardly to secure the tape 17 in a fixed position on the table 89. Simultaneously with such action, solenoid A of solenoid operated air valve SV–1 is energized which connects the rod end of pneumatic cylinder 44 with exhaust while connecting conduit 110 with conduit 113 which pressurizes the rod end of pneumatic cylinder 44 thereby retracting the piston rod 45 to release the tape. Carriage 39 is retracted rearwardly as viewed in FIG. 3 by the action of the oscillating lever 58 in preparation for the next indexing or feeding operation. Solenoid B of solenoid operated air valve SV–4 is then energized connecting pressurized conduit 110 with the head end of pneumatic cylinder 75 via conduit 114 which moves piston rod 78 forwardly which pivots the shearing blade 85 initially in a clockwise direction as viewed in FIG. 3 to shear the tape 17 wherein such shearing action is completed when the links 81 and 82 are substantially vertical and in alignment, as viewed in FIG. 3, and with the further movement of the piston rod 78 in a forward direction moving links 81 and 82 toward each other thereby pivoting shearing blade 85 in a counterclockwise direction as viewed in FIG. 3 in preparation for the next shearing operation. Such action is sufficient to perform the severing operation. However, in those instances where it is desired to shear heavy wire strands, solenoid A of solenoid operated air valve SV–4 may be energized which connects pressurized conduit 110 with conduit 115 which pressurizes the rod end of pneumatic cutter cylinder 75 retracting the piston rod 78 and moving the shearing blade 85 in a clockwise direction, then a counterclockwise direction as described above. However, under the conditions as set forth in the operation, solenoid A of solenoid operated air valve SV–5 is energized by the next cycle of operation performing such shearing action as described above. Solenoid B of solenoid operated air valve SV–3 is then energized connecting pressurized conduit 110 with conduit 116 which pressurizes the rod end portion of pneumatic clamp cylinder 70 thereby unclamping tape 17. Table 89 is then magnetized thereby flattening the tape that has been sheared and the previously cut tape that has been spliced in preparation for the next splicing operation, such action permitting the thin flexible stock to be prepositioned prior to movement of the cut section of tape 17 laterally into abutting engagement with the previously cut spliced sections. The table 89 is then de-magnetized and solenoid A of solenoid operated air valve SV–2 is then energized connecting pressurized conduit 110 with conduit 117 which pressurizes the head end of pneumatic cylinder 94 which moves the splicing plate 92 rightwardly as viewed in FIG. 2 such that the recessed portion 93 overlaps the upper surface of the cut section. Plate 92 then moves the cut section laterally such that the leading edge of such cut section is moved into abutting engagement with the trailing edge 105 of the previously cut section. Upon completion of the splicing operation, plate 92 is returned or moved in a leftward direction as viewed in FIG. 2 upon energization of solenoid B of solenoid operated air valve SV–2 which connects conduit 110 with conduit 119 which moves the piston rod of pneumatic cylinder 94 leftwardly (as viewed in FIG. 2) to move the splicing plate rearwardly in conditioning such splicing plate for the next operation. Upon movement of the tape 17 underneath the electric eye 104, which energizes solenoid B of solenoid operated air valve SV–5 to connect pressurized conduit 110 with conduit 118 to operate clutch 98 which then moves the spliced stock 103 rightwardly as viewed in FIG. 2 until the electric eye 104 senses that the spliced stock has moved a predetermined amount which then energizes solenoid A of solenoid operated air valve SV–5 which connects conduit 118 with exhaust to re-actuate clutch 98, thereby interrupting the movement of the spliced stock 103 on table 89. Before carriage 39 has completed its rightward movement as viewed in FIG. 3, solenoid B of solenoid operated air valve SV–1 is energized to connect pressurized conduit 110 with conduit 111 which pressurizes the head end of pneumatic index cylinder 44 which clamps the tape 17 between the piston rod 45 and the upwardly extending projection 47 on carriage 39 such that the tape 17 is moved rightwardly as viewed in FIG. 3 which releases the bond between the forwardmost disposed portion of the tape 17 from the blade 69' such that the tape 17 may be fed past the blade 69'. Unless such action is taken the forward-most end portion of tape 17 will tend to stick during the forward movement of the carriage 39 providing an unsatisfactory feeding thereof. Pneumatic index cylinder 44 remains energized during the forward or leftward movement of the carriage 39 as viewed in FIG. 3 such that the tape is fed past the cutter 85 for the full length of the indexing unit 32 in preparation for a second cutting action as described above. These actions are repeated to form a continuously extending wire overhead strip of approximately 17 degree angle from the longitudinal center line of the rubberized sheet of the parallel strands.

The electric control circuitry for the fabricating unit is shown in FIGS. 9a and 9b. Power is supplied through conductors L1, L2 and L3 to the primary winding 120 (shows in FIGS. 9a and 9b) of the transformer T1 where the voltage is stepped down to 110 volts in the secondary winding 121. A three pole switch S–1 located on conductors L1, L2 and L3 operates to energize such primary windings upon depression thereof. The conductors L1, L2 and L3 supply current to the index drive motor 48, the windup drive motor designated M2, and the motor 97. Branch conduits L4 and L5 from conductors L1 control means which is connected through suitable control designated 122 which controls the energization and de-energization of the magnetic chuck or table 89. An operator's station, designated 123, has an on and off control means which are connected through suitable conductors to drum switches DS5 and DS6 which are used to control the magnetization and de-magnetization of table 89 through contacts located on the rotatable drum as described hereinabove. Switch DS6 is normally closed whereas switch DS5 is normally open. The secondary winding 121 is connected between the main conductors 125 and 126 of the central circuit. A number of branch circuits are connected between the main conductors for sequentially controlling certain of the functions of the apparatus through the control of relays, limit switches and double solenoid operated valves to be described. A branch conductor 130 operates to connect the switch S–4 with relay R–1 which relay R–1 upon energization starts the index drive motor 48. Relay R–1 operates to close contacts R1–3, R1–2, R1–3 on conductors L1, L2 and L3 to energize index motor 48. In addition, relay R1 closes contact R1–4 on conductor 131 which sets up a holding circuit shorting out switch S–4. Conductor 133 operatively connects the start switch S–2 which upon depression conditions the circuit to start the wind up motor, which motor is controlled by the energization of relay R–2 located on conductor 133. Switches S–3a and S–3b on conductors 133a and 133d upon actuation condition the circuit for running. A photo relay device designated 136 on conductor 135 between main conductors 125 and 126 operates photo relays PR1 and PR2 which control the wind-up mechanism for the completed fabricated stock as it comes off the splicing unit 32. Contact PR1–1 on conductor 137 controls the lowermost position of the stock on the wind-up unit 106 with the closing of such contact PR1–1 energizing control relay R–3 which in turn operates to close contact R3–1 on conductor 133a. With switch S–3a closed on conductor 133a, control relay CR–1 is energized which in turn closes contact CR1–1 on conductor 133c. A limit switch LS1 on conductor 138 operating as an indicator is closed when there is stock for operation of the fabricating unit 23. Assuming LS1 and switch S–6 closed, control relay R–4 is energized which (1) closes contact R4–1 which sets in the holding circuit for control relay R–4 on conductor 138 and (2) closes contact R4–2 on branch conductor 128 for the lower portion of the control circuit. Control relay R–4 initially starts the automatic cycle in operation. Control relay R–4 closes contact R4–3 on conductor 139 which energizes control relay CR–2 which in turn closes contact CR2–1 on conductor 143 which energizes clutch 51 of main index drive motor 48 which in turn begins rotation of the control drum which controls the cams which actuate the respective drum switches designated DS1 through DS11. Conductor 144 through normally closed contact CR2–2 maintains the energization of brake solenoid 145 of the main index drive clutch 48. Normally open contact PR3–1 on conductor 146 upon closing operates to energize solenoid B designated SV5–B of solenoid operated valve SV5 which connects pressurized conduit 110 to conduit 118 to operate clutch 98 which in turn advances the spliced stock 103 rightwardly as viewed in FIG. 2 to the precise position in preparation for the next splicing operation. Energization of solenoid A designated SV5–A of solenoid operated valve SV–5 on conductor 147 is controlled by contact PR3–2. Conductors 148, 149, 150 and 151 operate to energize solenoids A and B designated SV–1A, SV–1B, SV3–A and SV3–B, respectively, for control of solenoid operated valves SV–1 and SV–3, through drum switches DS1, DS2, DS3 and DS4, respectively. The first two solenoid operated valves control the index cylinder 44 whereas the solenoid operated valve SV–3 controls the operation of the clamp cylinder 70. Conductors 152 through drum switch DS7 control ratchet relay RR which in turn controls contact CRR–1 on conductor 153 and normally close CRR–2 on conductors 154. Relay RR is essentially a relay selectively and sequentially operating to close contact CRR–1 and closing contact CRR–2. Such contacts operate to control solenoids A and B designated SV4–A and SV4–B of solenoid operated valve SV–4. If desired, an additional cam may be inserted on the rotatable drum to energize relay RR in sequence in quick succession thereby energizing solenoids A and B of solenoid operated valve SV–4 in quick succession which thereby performs a double cutting operation which assures a complete cut of the wire strands which are held by the clamp cylinder 70. As presented herein it is assumed that the single cut is sufficient to sever the stock and thereby only one cam is needed to actuate switch DS7. Conductors 155 and 156 operate through drum switches DS8 and DS9 to actuate sequentially solenoids A and B designated SV2–A and SV2–B of solenoid operated valve SV–2 of the splicer cylinder 94.

In the operation of the fabricating unit, the circuit is energized as described above wherein the transformer T1 is energized and the electromagnetic chuck control 119 is conditioned for operation. Switch S–4 is depressed which energizes relay R1 which starts the rotation of index drive motor 48 by the closing of contacts R1–1, R1–2 and R1–3 on conductors L1, L2 and L3. In addition, relay R1 closes contact R1–4 on conductor 131 which sets in the holding circuit for relay R1. Switches S–3a and S–3b on conductors 133a and 133d are depressed to put the circuit in condition for operation as described above. Switch S–5 is set on automatic thereby closing the contacts on conductor 134 to condition the energization of control relay CR1. Relay CR1 closes contact CR1–1 on conductor 133d. Assuming that sufficient stock is available for wind-up, contact PR1–1 on conductor 137 is closed thereby energizing control relay R3 which in turn closes contact R3–1 on conductor 133a thereby closing all contacts except contact PR2–1 on conductor 133 which contact is controlled by the photo relay wind-up control device 136. Closing of contact PR1–1 on conductor 137 starts up the wind-up unit 106 which wind-up unit is interrupted whenever the lower portion of the loop of the stock material goes above the upper eye of the photoelectric device PR2 designated 136 on conductor 135. Such wind-up devices are old and well known in the art and further description of them is not seen to be necessary. With sufficient stock in the festooner, limit switch LS1 is closed on conductor 138 and upon the operator depressing switch S-6 on conductor 138, control relay R4 is energized thereby closing contact R4–1 setting up a holding circuit, by-passing switch S–6, and closing contact R4–2 on conductor 128 which starts the automatic cycle. With the additional closing of contact R4–3 on conductor 139 control relay CR2 is energized, which control relay CR2 opens contact CR2–2 on conductor 144 which releases the brake and the closing of contacts CR2–1 on conductor 143 energizes clutch 51 of the main index drive unit 48 which imparts rotation to the control drum (not shown) in housing 108 to begin the sequence of operations. With motor 48 energized, lever arm 58 reciprocates the carriage 39 along the guideways 36 and 37 described above. However, no tape will be transported toward the cutting device until the index cylinder 44 is energized to clamp the tape between the piston rod 45 and the projection 47 on carriage 39. The drum control unit through the cams thereon closes initially switch DS1 on conductor 148 thereby energizing solenoid A designated SV1–A of solenoid operated valve SV1 which supplies pressurized fluid from a suitable source such as tank 109 to the head end of pneumatic cylinder 44 thereby extending the piston rod, and clamping the tape 17 between the piston rod and the upper projection 47 on carriage 39. Reciprocation of carriage 39 moves the tape between the respective guide blocks 33 and 34 for movement past the cutter on the table 89. Upon completion of the forward stroke of carriage 39, switch DS3 is closed by the rotatable drum which in turn energizes solenoid B designated SV3–A of solenoid operated valve SV–3 which connects pressurized conduit with conduit 112 which moves the clamping block 68 downwardly to secure the tape in a fixed position on table 89. Simultaneously with such action, drum switch DS2 is closed by the rotatable drum thereby energizing solenoid B (SV1–B) of solenoid operated air valve SV–1 which connects the head end of pneumatic cylinder 44 with exhaust thereby releasing the piston rod 45 from the tape 17 permitting carriage 39 to return rearwardly without effecting the position of the tape on the clamping block 68. The rotatable drum then closes contact DS7 on conductor 152 energizing ratchet relay RR which opens contact CRR–2 and closing contact CRR–1 on conductors 153 and 154, respectively, which energizes solenoid A or SV4–A of solenoid operated air valve SV–4 thereby extending the piston rod of pneumatic cutter cylidner 75 pivoting the cutter blade 85 downwardly about pivot 86 to sever the stock that is held in position on table 89 by the clamping block 68. Further movement of the piston rod 78 by the toggle links 81 and 82 retracts the cutter blade 85 away from the table 89 in preparation for the next cutting operation. The drum switch then closes contact DS4 on conductor 151 which energizes solenoid B (SV3–B) of solenoid operated air valve SV–3 which pressurizes the rod end of pneumatic clamp cylinder 70 thereby raising the clamping block 68 away from the blade 69'. The drum then closes contact DS–5 which energizes the magnetization of the table 89 which flattens the severed tape 17 on the table thereof as well as the previously cut spliced stock. Such action conditions the tape for the splicing action. Drum switch DS6 is then opened which de-energizes the magnetization of the table 89 simultaneously with the closing of contact DS8 on conductor 155 which controls the energization of solenoid A (SV2–A) of solenoid operated valve SV–2 which controls the energization of the head end of pneumatic splicer cylinder 94 which moves the splicing plate 92 rightwardly as viewed in FIG. 2 to splice the severed section of taps 17 with the previously cut portion as described above. Drum switch DS9 is then closed closing the contact on conductor 156 which energizes solenoid B (SV2–B) of solenoid operated valve SV–2 which controls the pressurization of the rod end of pneumatic splicer cylinder 94, thereby retracting the splicing plate to the position shown in FIG. 2. Photoelectric cell 104 located above the spliced portion closes contact PR3–1 and opens contact PR3–2 on conductors 146 and 147, respectively, upon having its beam interrupted, which action energizes the air clutch 98 of motor 97 thereby driving sheave 99 and roller 100 which in turn moves the spliced stock away from the splicing zone in preparation for the next splicing operation. Upon movement of the spliced stock at a point beyond the photoelectric cell 104, the beam of light detects the absence of stock, thereby closing contact PR3–2 and opening contact P3–1 to interrupt the output of motor 97 to the driven sheave 99 through clutch 98. To facilitate movement of the spliced stock away from the splicing zone, additional advancing means may be provided to accelerate the movement of such stock or, if desired, a pair of electric eyes may be located to move the stock at different rates of speed to facilitate such movement. The cycle of operation described above is repeated as additional tape sections are clamped and then spliced to the web which sections form the fabricated web or wire overhead unit which has the plural strands of wire that are disposed at an angle to the longitudinally extending center line of the web.

Various modifications are contemplated and may obviously be resorted to by those skilled in the art without departing from the invention, as hereinafter defined by the appended claims, as only a preferred embodiment thereof has been disclosed.

We claim:

1. The method of fabricating a wire overhead having bias cut strip material with wire strands running angularly relative to the longitudinal length of the strip comprising the steps of leading a plurality of wires in parallel spaced relationship through a supply of heated elastomeric material, forcing a mass of such elastomeric material about such spaced wires to form a thin narrow width continuous running tape having parallel strands of wire with elastomeric material therebetween, storing such tape on a festooner for periodic feeding, feeding a predetermined section of such tape onto a splicing table, clamping such tape in position, cutting such section of tape at a bias angle relative to said parallel strands, unclamping such tape, flattening out such section of tape and a previously cut portion of such tape by magnetizing and de-magnitizing of such splicing table to condition such tape section for splicing of such tape section to the previously cut portion of tape, and splicing such section of tape to the previously cut portion of tape.

2. The method of fabricating a wire overhead comprising the steps of passing a plurality of wire strands in parallel relationship into an extruder; forcing elastomeric stock between and around the wire strands in such extruder to form a narrow width tape having parallel strands and elastomeric material therebetween as such tape issues from the extruder; sequentially cutting elongated sections of such narrow width tape at bias angles to such parallel strands of wire; and splicing such narrow width sections of tape sequentially to the previously cut tape to form a wire overhead having angularly disposed strands of wire relative to the longitudinally extending center line of the formed wire overhead.

3. The method of fabricating as set forth in claim 2 wherein said sequential cutting into sections is preceded by the clamping of such tape prior to the cutting.

4. The method of fabricating as set forth in claim 3 wherein said seqential cutting is followed by the step of unclamping such cut section; magnetizing the cut section as well as previously cut spliced sections to flatten and condition such sections for splicing; and de-magnetizing such cut sections to facilitate the splicing of such sections.

5. A method of fabricating a bias cut spliced tape web comprising the steps of extruding a narrow width rubberized wire tape having spaced wire strands parallel to each other, conveying a predetermined length of such tape past a cutting means onto a splicing table that supports the tape web; clamping such tape adjacent to said cutting means, cutting such tape; unclamping the tape; flattening the cut tape and the bias cut spliced tape web onto the splicing table; and splicing the cut tape to the web.

6. The method of fabricating a spliced tape web as set forth in claim 5 wherein said flattening includes magnetizing the cut section of cut tape to condition such cut tape for splicing; and de-magnetizing such cut tape to facilitate the splicing of such tape to the previously cut tape forming the spliced tape web.

7. The method of manufacturing tire overhead material with strands embedded therein and whose strands run at an acute angle relative to the longitudinal length of such overhead material comprising the steps of feeding a plurality of parallel strands through an elastomeric extruder to form a continuous length of narrow width elastomeric coated tape whose strands are parallel to the respective side edges of the tape, cutting such narrow width tape into elongated strips whose cut edges make an acute angle with the parallel strands, and splicing the one side edge of a cut narrow width strip to another side edge of a previously cut narrow width strip with the cut edges of the tape aligned and forming the side edges of a continuous longitudinally extending overhead whose strands make an acute angle relative to the longitudinal center line of the overhead material.

8. The method of manufacturing tire overhead material as set forth in claim 7 wherein said feeding of said parallel strands into said extruder forms a tape whose width is in the order of one inch.

References Cited

UNITED STATES PATENTS 3,192,094  6/1965  Phillips et al. _____ 156—512 X

FOREIGN PATENTS 627,828  12/1959  Canada _____ 156—124

CARL D. QUARFORTH, Primary Examiner

R. E. SCHAFER, Assistant Examiner

U.S. Cl. X.R.

156—166. 264, 266, 304, 512

PO-1050
(5/69)

UNITED STATES PATENT OFFICE
CERTIFICATE OF CORRECTION

Patent No. 3,694,283    Dated September 26, 1972

Inventor(s) Ralph F. Cooper and Charles J. Wagner

It is certified that error appears in the above-identified patent and that said Letters Patent are hereby corrected as shown below:

Column 4, line 9, after the word second occurrence "portion" insert the word ---of---.

Column 4, line 54, after the word "of" delete [levers 81 and 82. The other end of lever] and insert the words ---lever 82 is pivotally secured to one end of---.

Column 4, line 64, the word "layers" should be ---levers---.

Column 6, line 32, "SV-5" should be ----SV-4---.

Column 6, line 69, the word "re-actuate" should be ---de-actuate---.

Signed and sealed this 20th day of February 1973.

(SEAL)
Attest:

EDWARD M. FLETCHER, JR.            ROBERT GOTTSCHALK
Attesting Officer                  Commissioner of Patents